Oct. 21, 1969  A. M. MORRIS  3,473,696
AUTOMATIC FEEDER
Filed May 16, 1967
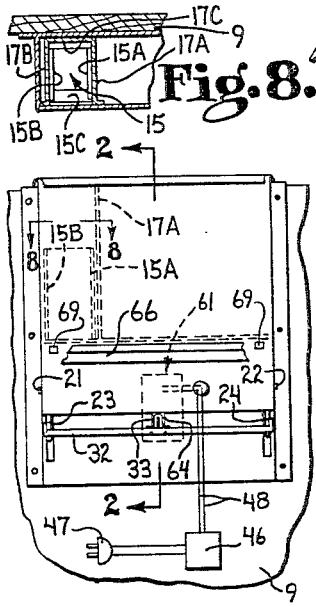
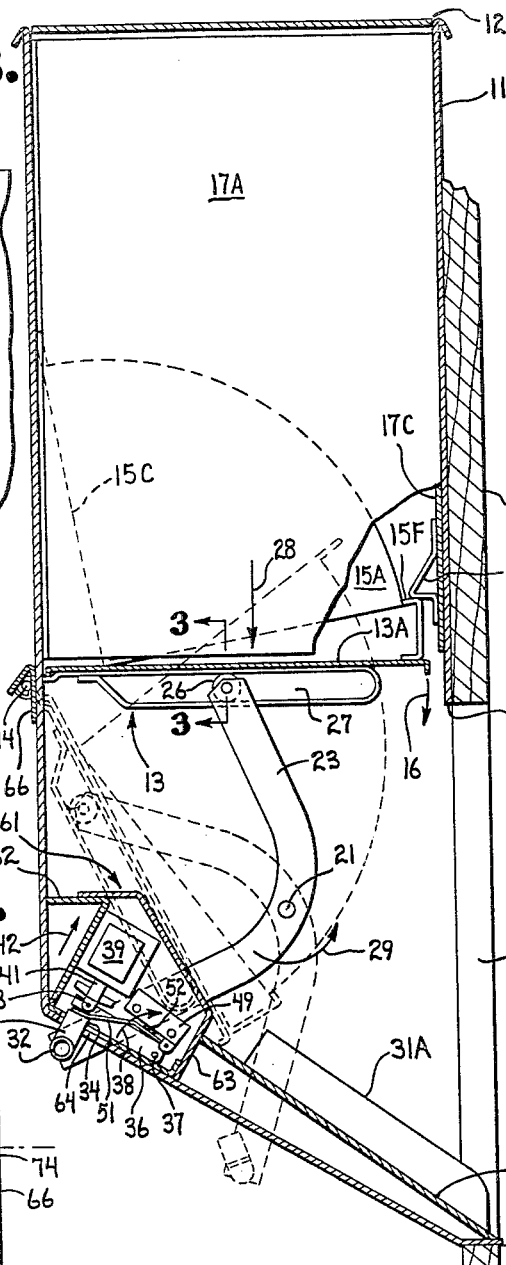
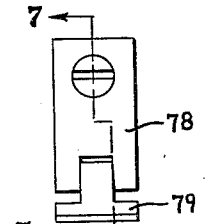
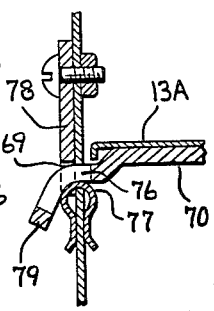
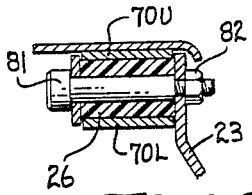
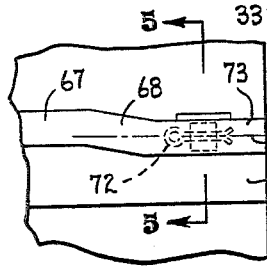
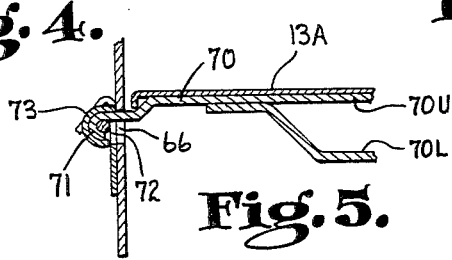
INVENTOR.
ALONZO MERRIL MORRIS
BY
Woodard, Weikart, Emhardt & Naughton
Attorneys United States Patent Office 3,473,696
Patented Oct. 21, 1969

3,473,696
AUTOMATIC FEEDER
Alonzo Merril Morris, 880 W. Jefferson St.,
Franklin, Ind. 46131
Filed May 16, 1967, Ser. No. 638,907
Int. Cl. B67d 3/00, 5/08
U.S. Cl. 222—70   8 Claims

ABSTRACT OF THE DISCLOSURE

A generally upstanding housing mounted to the wall of a horse's stall, and having a front wall opening in registry with a stall wall opening for passage of feed from the housing into the stall. A normally horizontal, downwardly-swingable support member in the housing above the front wall opening thereof and supporting feed thereon contained by the housing walls above the support member. A downwardly and forwardly inclined chute below the support member for directing feed deposited thereon from above, out through the opening into the stall. A pair of banana shaped arms pivotally mounted to housing walls, and having rollers at upper ends thereof normally supporting the support member, lower ends thereof having a bar extending thereacross below the chute with an upstanding lug engaged by an electrically operable latch normally preventing rotation of the arm on the pivots, whereby the arms are enabled to support the feed support member. A twenty-four hour timing apparatus operable to energize a solenoid at a selected time once during each twenty-four hours to raise the latch, releasing the bar and support arms and thereby releasing the feed support member to effect discharge of feed into the stall.

BACKGROUND OF THE INVENTION

Field of invention

This invention relates generally to automatic feeding apparatus for animals and more particularly one wherein a predetermined amount of feed will be dispensed at a selected time automatically once every twenty-four hours, and in a manner such that the animal has access to the dispensed feed but, although large enough to get at the feeding apparatus itself, is unable to manipulate it.

Description of the prior art

Known prior art apparatus includes devices of various types and configurations including means for automatic feed dispensing at predetermined intervals, means to convey fed to a number of dispensers, various arrangements for mounting such apparatus away from access of the apparatus itself to the animals, and other apparatus where portions are mounted at or near the floor of the place where animals are kept. Examples are U.S. patents as follows: 3,026,845, Mar. 27, 1962, Winter; 3,144,173, Aug. 11, 1964, France et al.; 3,150,798, Sept. 29, 1964, Sutton; 3,225,742, Dec. 28, 1965, Hagans; 3,256,861, June 21, 1966, Giltner; and Danish Patent No. 34,622.

Such apparatus is not acceptable for feeding a horse, for several reasons. It is desirable to feed a horse only twice a day, once in the morning and once in the evening. While it is often desirable in the mind of a horse owner to see the horse at least once a day, or be certain that the custodians of the horse do so, it is not always convenient to see the horse both in the morning and in the evening, when it should be fed. The evening visit and feeding can usually be accomplished conveniently by the individual attending to the horse, whether it be the custodian or owner. However the same is not true for the morning feeding.

Another factor of importance in the care of a horse as distinguished from many other animals is the fact that the horse is not only a large and strong animal, but is also an intelligent animal. They are therefore capable of defeating the purpose of machinery or equipment, unless it is designed and installed with care. Although horses are intelligent, they can display bad judgment in overeating if they ever have a chance. If a horse does this on one occasion in its lifetime, its future growth and development can be seriously impaired.

Another factor in the feeding of horses is that it is desirable to keep the hay fed to the horse separate from the grain, but dispense both types of feed in a manner whereby the horse can get at them at the desired time.

Finally it is desirable to have apparatus for automatic feeding of horses and which is readily useful in existing horse barn and stall structures.

SUMMARY OF THE INVENTION

Described briefly, in a typical embodiment of the present invention, the feed apparatus housing is mounted to the exterior of a horse stall so that the front wall of the apparatus is flush with the wall of the stall and an opening in the front wall of the housing is in registry with an opening in the wall. Immediately above the opening and extending across the housing is a plate assembly hinged to the back wall of the housing and capable of swinging downwardly therein. This is normally held in a horizontal position by rollers at the upper ends of two banana shaped arms pivotally mounted to side walls of the housing, and the member supports feed which is laterally contained within the front, rear, and side walls of the housing above the support member. A divider is provided on the member so that a narrow compartment is available for grain and a comparatively wide compartment for hay.

A downward and forwardly inclined chute is provided near the lower margin of side walls of the housing and receives feed dropped thereon by the support member when it is released to swing downward and discharge feed. To enable it to swing downward, a latch assembly normally retaining the arms is electrically operated by a solenoid controlled by a twenty-four hour timer set for the desired dispensing time.

BRIEF DESCRIPTION OF THE DRAWINGS

FIG. 1 is a rear elevational view of a typical embodiment of the invention mounted on the wall of a horse's stall and as seen from outside the stall.

FIG. 2 is an enlarged cross-section taken at line 2—2 in FIG. 1 and viewed in the direction of the arrows.

FIG. 3 is a further enlarged cross-section through the support roller assembly taken at line 3—3 in FIG. 2.

FIG. 4 is an enlarged fragmentary rear elevation showing a hinge detail.

FIG. 5 is a section through the hinge detail taken at line 5—5 in FIG. 4.

FIG. 6 is an enlarged fragmentary rear elevation showing an alternative hinge detail.

FIG. 7 is a section taken at line 7—7 in FIG. 6.

FIG. 8 is a section taken at line 8—8 in FIG. 1 and viewed in the direction of the arrows.

DESCRIPTION OF THE PREFERRED EMBODIMENT

Referring now to the drawings in detail the horse stall 8 has a vertical wall 9 of typical construction with an opening 10 therein through which feed can be dispensed into the stall according to the present invention.

A generally rectangular housing 11 has side walls with flanges mounted to the wall 9, the upper end 12 of the housing has a lid thereon and is well above the upper margin of the wall opening 10. A feed support assembly 13 in the housing is hinged at 14 on the rear wall to swing down in the direction of the arrow 16 to dispense hay and grain. It works somewhat like a hopper with a bottom-opening door, the feed support assembly 13 being the "door" and including a "tilting shelf" 13A. A grain container 15 is mounted on the shelf and has an inclined floor 15F and sector-shaped walls 15A and 15B, and rear wall 15C, upstanding therefrom. A grain retainer 17 secured in the housing and U shaped as viewed from above, includes the vertical partition wall 17A and wall 17B parallel thereto extending to upper end 12. The side-by-side walls 15A and 17A are offset from center of the housing, to provide a comparatively large compartment in the housing for hay, and a comparatively small one for grain.

At each side wall of the housing there is a pivot 21–22 for arms 23 and 24, respectively. These arms are banana or boomerang shaped for a reason which will become apparent.

At the upper end of arm 23 is a roller 26 received in an elongated slot or track 27 provided by a properly formed metal support strip mounted on the lower surface of the door. A like construction is provided on arm 24. The weight of the grain and hay on the feed support assembly pushes downward on the roller 26 in the direction of the arrow 28 establishing a turning moment on the arms 23 and 24 tending to rotate them around their pivots in the direction of the arrow 29. Therefore, unless the arms are restrained in some way, the grain and hay support assembly will swing down to the position shown in the dotted outline, thus dumping the hay and grain on the downwardly and forwardly inclined sheet 31 of the housing, from which the grain can fall into a box or trough 9A mounted about chest-high on the wall 9, and the hay can fall onto the floor of the stall. Guide plate 31A on sheet 31, aligned with walls 15A and 17A, aids in preventing grain from falling on the floor.

To avoid the dumping of the hay and grain until the desired time, a bar 32 extends between the lower ends of the arms and has a member 33 affixed to it, this member being a metal strip formed into a lug in the illustrated embodiment. It is engaged at the point 34 by a latch 36. This latch is pinned to the housing at 37 so it can swing up and down in the direction of the arrow 38 about the pin axis parallel to the pivotal axis of the arms and hinge axis of the door. The latch is normally disposed downward in the position shown whereupon it engages the lug 33 and prevents rotation of the arms in the direction of the arrow 29. However, there is a solenoid 39 having an armature 41 pinned to the latch at 43. When the solenoid 39 is energized, the armature will be pulled up in the direction of the arrow 42. When the latch is pulled up by the solenoid it will disengage from the lug 33 on the bar 32 and thus allow the arms to be swung in the direction of the arrow 29 by the weight of hay and grain on the support assembly door.

To energize the solenoid, a timer 46 is employed and in the illustrated example may be mounted to the stall wall 9, although many other locations might be deemed just as suitable. This timer can receive energy from the usual wall plug 47 and can be set to apply energy across the wires 48 once each twenty four hours, at a designated time. Many suitable timers for this purpose are available, and just one example is a "Dayton" time switch. A switch 49 of the normally-open variety is included in circuit with the solenoid 39 and the input wires 48. When the lug 33 is in the latched position shown, a switch control lever 51 engaging the switch button 52 keeps the normally-open contacts of the switch closed so as to enable energization of the solenoid when the lug is latched. However, immediately upon release of the lug, the lever 51 is released from its switch closing condition, and the switch 49 is open. In this way, although the timer would normally keep the solenoid energized for a short while, it is de-energized immediately after the lug is released. It cannot again be re-energized until the feed dispensing door is again raised, and thereby returned to its initial position. During this return of the door, the rollers 26 in the tracks 27 on the bottom of the door, move the arms and bar 32 back up to the initial position whereupon the lug 33 can again close switch 49 when the latch 36 is disposed for latching the lug. Because the current requirement of the solenoid is small, one timer can be used for several of my feeders.

Because of the arrangement disclosed herein, the apparatus is immune to damage by the horse, and none of the working parts can be worked by him. The only portions exposed in any way to him are the arms 23 and 24, but very small portions thereof and they are almost flush with the side walls, giving him no opportunity to work them to release the feed. Likewise the lip member 54 extending inwardly from the front wall 17C of the grain retainer above the housing opening 56 and atop the front margin of the grain container floor 15F on the door, seals in the grain and prevents the door from being moved upward by the horse. This inclined floor facilitates sealing of the grain and also improves discharge of the grain upon release of the door. Because of the door and housing construction, the horse can do nothing detrimental to the apparatus after the feed is dispensed therefrom.

The upper margins of the side and back walls 15A, B, and C of the grain container normally seal respectively against walls 17A and B and the housing rear wall, preventing leakage of the grain. The grain container 15 and retainer 17, being integral units secured to the shelf and housing, respectively, by screws, are interchangeable from end to end of the shelf and housing to accommodate use of the feeder in left-hand or right-hand box stalls.

Virtually all of the latching apparatus is enclosed in the box 61 which includes the mounting bracket 62 and cover 63, which can be secured to the housing by the use of screws so that none of the latching apparatus is exposed or visible from inside the stall. Even at the outside of the stall and viewed from the rear of the housing as shown in FIG. 1, there is nothing exposed or visible other than an aperture at 64 on the lower face of the chute 31 and through which the lug 33 enters the box 61 for latching. When the lug is released by the latch, the bar 32 on the lower ends of the arms moves in an arc very close to the lower surface of the chute and toward the wall 9 of the stall, minimizing the space requirement for operation of the device. Yet it is easily accessible to the operator from outside the stall when it is desired to pull it back to the original position to raise the door to its initial position whereupon it is ready for refilling of the hopper compartment with hay and grain.

The drawings illustrate two arrangements for hinging the door to the back wall. In the one illustrated construction of FIGS. 2, 5, and 6, a strip 66 extends the width of the back wall of the housing and is spot welded or otherwise secured thereto. Between locations 68 adjacent apertures 69 in the rear wall, the strip has a downwardly turned flange 67. The shape of the flange is somewhat modified opposite the apertures 69 to receive the rear ends 71 of the slot-forming door mounting members 70, these rear ends being wrapped around a hinge pin 72 at each aperture location. These hinge pins can be in the form of cotter pins received in the modified portion of the member 66 which is curved around the curved ends of the door mounting members 71 as at 73. In this way, the member 66 mounted to the rear wall of the housing and having the cotter pin 72 mounted therein serves as both outer and inner bearing means with respect to the hinge axis 74 of the cotter pin for the door support members 70.

An alternative construction is shown in FIGURES 6 and 7 wherein the rear end portion 76 of the door supporting member 70 is received through an aperture 69 in the rear wall of the housing and is downwardly turned around a cylindrical bearing surface 77 provided in the form of a "Tinnerman" spring clip mounted on the wall at the lower margin of the aperture 69. This end of the member 70 is retained in the opening by both a cover plate 78 preventing substantial upward movement thereof and by the laterally extending tabs 79 at the distal end of the member 70. Upon removal of the plates 78, the arms 70 can be removed from the back wall of the housing.

FIGURE 3 shows a typical mounting of the roller 26 to the arm 23 and between the upper and lower slot forming portions 70U and 70L of the door support member 70 the rolled being mounted on the shoulder screw 81 affixed to the arm 23 by a suitable nut 82.

From the foregoing description, it is believed apparent that the present invention is an excellent solution to the problems of the prior art.

While the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:

1. Feed apparatus comprising:
   a housing;
   a feed support member disposed in said housing and swingable downwardly therein to release feed for an animal;
   chute means in said housing below said support member for passing released feed to a discharge point;
   said feed support member having a generally horizontal upper surface supporting feed, with an upstanding partition wall portion located thereon to provide a comparatively narrow compartment for grain storage and a comparatively wide compartment for hay storage, on said support member;
   said chute means including a downwardly inclined plate with a guide plate upstanding therefrom and aligned with said partition wall portion of said feed support member upon the downward swinging thereof, to guide hay and grain during passage to said discharge point.

2. The apparatus of claim 1 and further comprising:
   an upwardly opening box at a lower frontal edge of said inclined plate and aligned with said comparatively narrow compartment to receive grain released therefrom but avoid interference with hay released from said comparatively wide compartment.

3. Feeding apparatus comprising:
   a housing;
   a feed support member disposed in said housing and swingable downwardly therein to release feed for an animal;
   chute means in said housing below said support member for passing released feed to a discharge point;
   said housing including an upstanding rear wall with a pair of horizontally spaced apertures therein;
   said feed support member having a pair of hinge portions formed integral therewith, each hinge portion extending through a corresponding one of said apertures and cooperating with said rear wall to provide a horizontal axis at said rear wall for the downward swinging of said support member.

4. The apparatus of claim 3 and further comprising:
   curved bearing members mounted to said rear wall and supporting said hinge portions, said hinge portions being curved around said bearing members and resting thereon.

5. Feeding apparatus comprising:
   a housing;
   a feed support member disposed in said housing and swingable downwardly therein to release feed for an animal;
   chute means in said housing below said support member for passing released feed to a discharge point;
   a first support arm pivotally mounted to said housing at an elevation below said support member,
   said support member having a swing axis adjacent a rear edge thereof at a rear wall of said housing,
   said support arm having roller means at an upper margin thereof normally engaging and vertically supporting said support member at a first support point in front of said swing axis and generally horizontally spaced therefrom, the location of said support point with respect to the pivotal mounting being such that the downward force of said support member against said roller means establishes an arm turning moment on said arm tending to turn said arm in one direction about the axis of said pivotal mounting,
   timed latching means coupled to said arm and operable, when in a latched condition, to prevent turning of said arm by said moment,
   said support member being operable upon release of said latch means to turn said arm and swing downwardly to release feed stored on said member in said housing.

6. The apparatus of claim 5 wherein:
   the pivotal mounting of said first support arm to said housing is at one side wall of said housing, said apparatus further comprising:
   a second support arm pivotally mounted to the side wall of said housing opposite said one side wall and pivotal on an axis colinear with the pivotal axis of said first arm and parallel to said swing axis,
   said second support arm having roller means at an upper margin thereof normally engaging and vertically supporting said support member at a second support point in front of said swing axis and horizontally aligned with said first support point;
   a cross bar connected to said arms and having a lug extending generally upwardly therefrom,
   said latching means including a latch pivotally mounted to said housing for swinging up and down around a latch axis parallel to said pivotal axis, said latch being normally disposed in a downward latching position and having an abutment normally abuttingly engaging said lug and preventing the turning of said arms in said one direction,
   said latching means further including a solenoid mounted to said housing and coupled to said latch and operable, when energized, to swing said latch up around said latch axis from said latching position to release said lug,
   said arms being curved to position said bar and lug near the rear wall of said housing while latched and enable downward and forward swinging of said bar and lug under said chute means by said support member when said lug is released from said latching member,
   said latching means and said lug and bar remaining at all times shielded by said chute means for inaccessability to the animal to be fed by said apparatus.

7. The apparatus of claim 6 wherein:
   said latching means includes a timer settable for operation once each twenty four hours to thereupon close a circuit through said solenoid for unlatching said lug, to allow said support member to swing downwardly.

8. Feeding apparatus comprising:
   a housing;
   a feed support member disposed in said housing and swingable downwardly therein to release feed for an animal;
   chute means in said housing below said support member for passing released feed to a discharge point;
   generally upstanding side, front, and rear walls on said housing;
   an animal stall wall mounting said housing above the floor of the stall for the animal to be fed, said housing being disposed on the outside of said stall wall and said housing having an opening in the front wall thereof faced by a portion of said chute means and disposed in registry with an opening in said stall wall to enable dispensing of feed from said housing through said openings into said stall;

a control arm mounted on said housing and normally keeping said support member in position above said opening to support feed thereon;

automatic latching means coupled to said arm and normally retaining said arm in said normally keeping condition;

said chute means portion which faces said opening being a sheet extending downwardly and forwardly between said side walls from said rear wall of said housing and forming a lower margin of said opening in said front wall, a box mounted in said housing on said chute sheet and near said rear housing wall and isolating said latching means for access to an animal in said stall, and a means connected to said arm outside said housing and outside said stall wall and insertable through an aperture in said sheet for engagement and retention by said latching means to retain said arm, said arm having means manually accessible to a person outside said stall wall for resetting said arm from a position assumed for feed release back to said normally keeping condition.

References Cited

UNITED STATES PATENTS

| 245,795 | 8/1881 | Dias | 119—56 X |
| 1,192,663 | 7/1916 | Masek | 119—56 |
| 2,131,407 | 6/1938 | Ramsey | 119—56 |

FOREIGN PATENTS

| 25,837 | 4/1920 | Denmark. |
| 334,125 | 3/1921 | Germany. |

ROBERT B. REEVES, Primary Examiner

F. R. HANDREN, Assistant Examiner

U.S. Cl. X.R.

49—397; 119—51.1, 56; 222—556

PO-1050
(5/69)

UNITED STATES PATENT OFFICE
CERTIFICATE OF CORRECTION

Patent No. 3,473,696　　　　　　　　Dated October 21, 1969

Inventor(s) Alonzo Merrill Morris

It is certified that error appears in the above-identified patent and that said Letters Patent are hereby corrected as shown below:

Column 1, line 3, delete "Merril" and insert--Merrill--.

Column 1, line 12, delete "horse's" and insert--horse--.

Column 3, line 9, delete U and insert--"U"--.

Column 5, line 10, delete "rolled" and insert--roller--.

Column 7, line 19, delete "for" and insert--from--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents